United States Patent

[11] 3,599,014

[72] Inventor Ralph W. Carp
Baltimore, Md.
[21] Appl. No. 821,555
[22] Filed Apr. 30, 1969
[45] Patented Aug. 10, 1971
[73] Assignee The Bendix Corporation

[54] FREQUENCY-SENSITIVE CIRCUIT HAVING OUTPUT PROPORTIONAL TO FREQUENCY DIFFERENCE BETWEEN TWO INPUTS
15 Claims, 2 Drawing Figs.
[52] U.S. Cl. ............................................. 307/233,
328/133, 328/127, 328/141
[51] Int. Cl. .............................................. H03k 5/20
[50] Field of Search ........................................ 307/232,
233; 328/127, 133, 134, 155, 141

[56] References Cited
UNITED STATES PATENTS
2,629,824  2/1953  MacKay et al. ............... 328/127 X
2,673,929  3/1954  Huffman ....................... 328/127
3,021,481  2/1962  Kalmus et al. ................ 328/133 X
3,119,029  1/1964  Russell ......................... 328/127 X
3,136,900  6/1964  Bell ............................. 328/133 X
3,187,195  6/1965  Stefanov ...................... 328/133 X
3,206,616  9/1965  Webb ........................... 307/232

Primary Examiner—John N. Heyman
Attorneys—Plante, Arens, Hartz, Hix and Smith, Bruce L. Lamb, William G. Christoforo and Lester L. Hallacher ABSTRACT: A slip computer for generating a DC voltage output signal proportional to the difference in frequency of two input frequency signals which utilizes a differentially charged capacitor, charged by a charging current whose average value is correlated to the frequency of one frequency input signal and discharged by a discharging current whose average value is correlated to the frequency of the other frequency input signal. Capacitor voltage as determined by a high input impedance voltage detector is a measure of frequency difference.

PATENTED AUG 10 1971 3,599,014

INVENTOR
RALPH W. CARP

BY William G. Christoforo
ATTORNEY

3,599,014

FREQUENCY-SENSITIVE CIRCUIT HAVING OUTPUT PROPORTIONAL TO FREQUENCY DIFFERENCE BETWEEN TWO INPUTS

BACKGROUND OF THE INVENTION

This invention relates to slip-computing circuits and more particularly to a novel computing circuit for generating a direct current signal which is proportional to the slip of one wheel of a wheeled vehicle with respect to another wheel thereof for utilization in a slip-controlled adaptive braking system, differential locking system, or other system responsive to slip between vehicle wheels.

The wheel-braking pressure which can be exerted by a motor vehicle operator is sufficient to cause the wheels to lock with resultant increase in stopping distance and reduced lateral vehicle stability. This is especially true when driving on low frictional coefficient surfaces. Mu slip curves, which are plots of the tire-road interface frictional force versus wheel slip, are well known in the art. These curves, which are empirically obtained, show a maximum mu in the range of 15 to 25 percent slip. Height and sharpness of this maximum point is generally dependent upon the nature of the tire-road interface and its condition. Adaptive braking systems are known which permit in response to wheel deceleration, only that amount of brake pressure to be applied which causes a wheel slip corresponding to the maximum mu point on the mu slip curve for the conditions then encountered, thus providing optimum braking to the vehicle being controlled. These maximum mu adaptive braking systems are quite efficient but are fairly complex; however, they are required for vehicles such as passenger cars on which all wheels are braked simultaneously. However, on a vehicle which has free-running unbraked wheels such as a tractor trailer, wherein the tractor front wheels are free running, a simpler adaptive braking system can be used with resultant excellent braking characteristics. In this latter system, means are provided for controlling the braking force on the braked wheels so that these wheels slip with respect to a free-running wheel during braking at a predetermined rate, suitably approximately 15 percent slip which is quite close to the maximum mu point of the mu slip curve under most conditions of tire-road interface. Generally, automatic control of the braked wheels by the adaptive braking system is provided only under conditions of incipient wheel skid, which for the purpose of this invention can be defined as any time that wheel slip exceeds a predetermined value. Thus, the adaptive braking system brake-controlling means of necessity comprises means for attenuating the braking force as originally applied manually by the vehicle operator only after wheel lock becomes imminent and thereafter reapplying the original braking force as the wheel lock situation is relieved. A number of automatic brake-controlling means are well known and need not be described here. Electronic circuitry is also well known which can, in response to a wheel speed signal, provide control signals for the braking-force-controlling means. For a slip-controlled adaptive braking system such as the type described, it is known that the braked wheel during braking will always rotate at a speed equal to or less than the speed of the free-running wheel.

SUMMARY OF THE INVENTION

It is thus an object of this invention to provide a slip computer circuit which will generate a DC voltage signal which is proportional to the slip of a braked vehicle wheel with respect to a free-running wheel. In other applications for a slip computer such as in a differential locking system wherein it is desired to lock the drive differential when one drive wheel is rotating at a much higher speed than another drive wheel, indicating that the rapidly rotating drive wheel has lost traction, it is not known beforehand drive wheel will be rotating faster. It is thus another object of this invention to provide a slip-computing circuit which will generate a DC voltage signal which is proportional to the difference in rotational speed of two vehicle wheels.

It is one more object of this invention to provide a slip-computing circuit which will generate an output signal which is proportional to the difference in frequency of two nut frequency signals.

Briefly, to accomplish the above objects of the invention, a train of pulses standardized as to amplitude and having a pulse repetition frequency proportional to the rotational speed of one wheel is coupled through a relatively small capacitor and a unidirectional current device, suitably a diode, to a larger capacitor which is discharged in a similar manner by a train of similarly standardized pulses having a pulse repetition frequency proportional to the rotational speed of another wheel. Voltage across the large storage capacitor comprises a slip voltage signal which is proportional to the slip of one wheel with respect to the other wheel and is suitably sampled by a high input impedance probe.

DESCRIPTION OF THE PREFERRED EMBODIMENT

Figure 1:
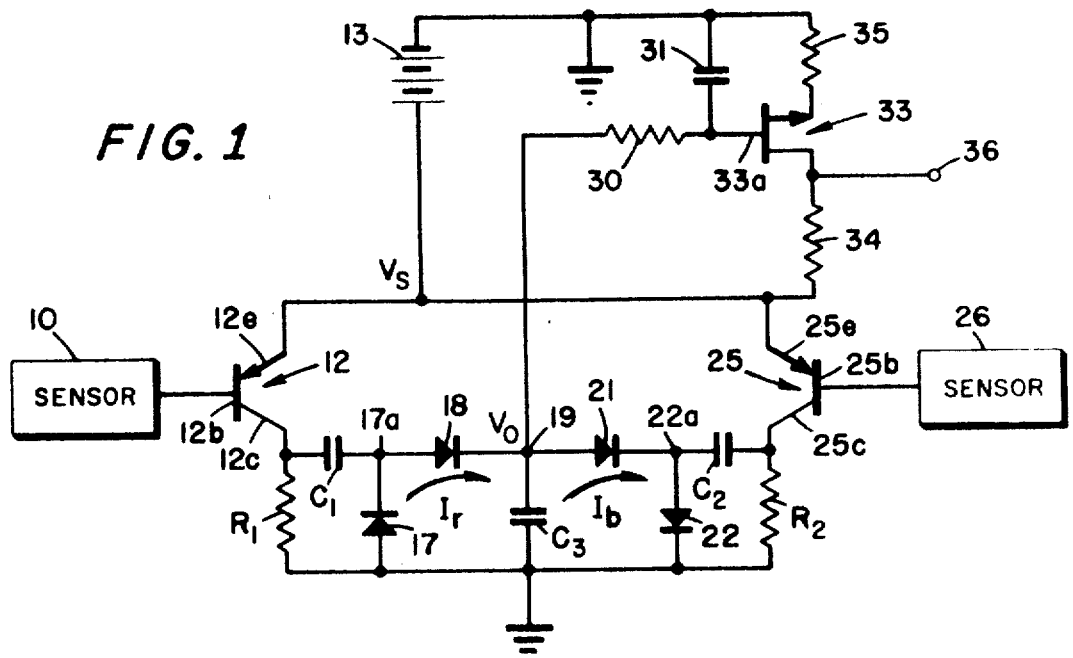
FIG. 1 is a schematic of the invention.

Referring to FIG. 1, a wheel speed sensor 10 which is drivenly attached to and senses the rotational speed of one vehicle wheel generates an electrical frequency signal whose frequency is proportional to the wheel speed and which is impressed on base electrode 12b of transistor 12. At the same time, sensor 26 which is drivenly attached to and senses the rotational speed of a second wheel generates a second electrical frequency signal whose frequency is proportional to the speed of the second wheel, this second frequency signal being applied to base electrode 25b of transistor 25. Wheel speed sensors 10 and 26 are well known in the art and each briefly, comprise a variable reluctance alternating-current-type generator whose rotor is suitably connected through speedup gears to rotate with the wheel being sensed, and whose stator is fixed to the vehicle frame. The sensor provides a signal having a frequency which varies directly as rotor speed and consequently as the wheel speed.

Figure 2:
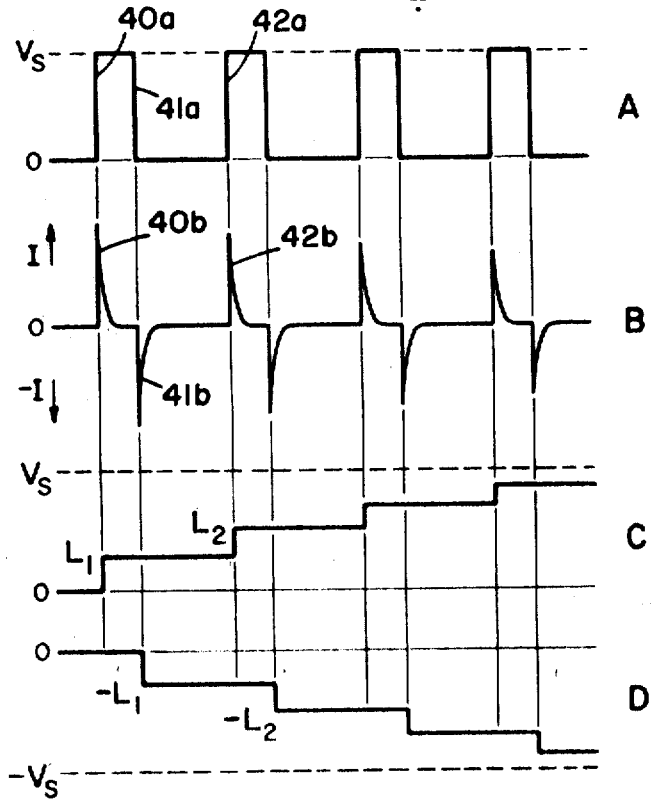
FIG. 2 is a time plot of voltage and current waveforms at selected points in the schematic of FIG. 1.

A DC voltage source 13 impresses a voltage $V_e$ at the common emitter terminals 12e and 25e and is related to the frequency signals at base electrodes 12b and 25b respectively so that each transistor 12 and 25 is saturated for some part of a cycle of the frequency signal applied to its base and is cut off during the remainder of the cycle. A first resultant voltage pulse train appears between collector electrode 12c and ground across resistor $R_1$ the pulses therein having standardized amplitudes approximately equal to $V_e$ but having widths which are dependent upon the pulse repetition frequency of the signal applied at base electrode 12b. Referring now also to FIG. 2, there is seen on line A thereof an idealized, graphical representation of this latter pulse train.

Returning to FIG. 1 a positive counting circuit for charging storage capacitor $C_3$, which is connected between positive terminal 19 and ground, is comprised of capacitor $C_1$, which is relatively small with respect to $C_3$, connected between collector electrode 12c and junction 17a, a first unidirectional current device 18 for allowing current to flow from junction 17a into positive terminal 19, and a second unidirectional current device 17 for allowing current to flow from ground into junction 17a.

A second voltage pulse train appears between collector electrode 25c and ground across resistor $R_s$, these latter pulses having standardized amplitudes approximately equal to $V_e$ but having widths which are dependent upon the pulse repetition frequency of the signal applied at base electrode 25b. This pulse train is very similar to the pulse train seen at line A of FIG. 2. A negative-counting circuit for negatively-charging capacitor $C_3$ is comprised of capacitor $C_2$, which in this embodiment is equal to capacitor $C_1$ and which is connected between collector electrode 25c and junction 22a, a third unidirectional current device 21 for allowing current to flow from positive terminal 19 to junction 22a, and a fourth unidirectional current device 22 for allowing current to flow from junction 22a to ground. The aforementioned unidirectional current devices are suitably semiconductor diodes.

Assuming now that there is no train of voltage pulses at collector electrode 25C (speed sensed by sensor 26 is zero) but that a train of voltage pulses having standardized amplitudes and a pulse repetition frequency proportional to the speed of the wheel sensed by sensor 10 appears on collector electrode 12c. As the positive-going excursions of the voltage pulse as exemplified by pulse face 40a in FIG. 2 occur, the charge on capacitor $C_1$ cannot change instantaneously so that the voltage at junction 17a swings positive, back-biasing diode 17 but causing a current $I_r$ to flow through diode 18 toward positive terminal 19 thus tending to charge capacitor $C_3$. This charging current is exemplified in FIG. 2 by current pulse 40b. At the end of the voltage pulse, as exemplified by pulse face 41a, the drop in voltage places junction 17a at a negative potential equal to the charge accumulated on capacitor $C_1$ thus back-biasing diode 18. However, diode 17 is now forward biased and a current flows from ground into junction 17a to discharge capacitor $C_1$. This latter current pulse is exemplified by pulse 41b of FIG. 2. This discharging of capacitor $C_1$ prevents the voltage thereacross from building to a value which would render the circuit insensitive to subsequently applied pulses.

It will be remembered that capacitor $C_1$ is relatively small with respect to $C_3$. Thus, with each positive-going excursion of the voltage pulse train at collector electrode 12c, the voltage at positive terminal 19 will increase by an amount proportional to the product of the ratio of $C_1$ to $C_3$. Of course, as the voltage across $C_3$ increases, the incremental voltage increases thereacross with each succeeding positive pulse excursion will decrease. If the charge across capacitor $c_3$ is not allowed to discharge, the voltage thereacross will eventually approach $V_s$ as a limiting value in successively decreasing steps. This is plotted on graph C of FIG. 2 which shows the voltage buildup across $C_3$ when there is no signal at collector electrode 25c and to which reference should now also be made. Assuming all circuit elements, are discharged, the positive-going excursion of the first voltage pulse at collector electrode 12c causes the voltage across $C_3$ to rise from its discharged state toward $V_s$ by an amount $L_1$ proportional to the ratio $C_1/C_3$ and the difference in the capacitor's instantaneous voltage and $V_s$. At the second positive-going voltage excursion, for example pulse face 42a, capacitor $C_3$ has already acquired some small voltage level thus only a decreased current pulse 42b may now flow into positive terminal 19. The resulting voltage step, as before, is proportional to the ratio $C_1/C_3$ and the difference in the capacitor's instantaneous voltage and $V_s$. This difference voltage has now decreased by an amount equal to the voltage impressed across $C_3$ by the first voltage pulse ($L_1$). The voltage across $C_3$ thus rises to the new value $L_2$, the step from $L_1$ to $L_2$ being less than the step from 0 to $L_1$. As aforementioned, if $C_3$ is not allowed to discharge, the voltage thereacross will eventually approach $V_s$ as a limiting value.

In a manner which should now be obvious the voltage across $C_3$ will decrease to $-V_s$ if a voltage pulse train now appears at collector electrode 25c and the pulse train at collector electrode 12c disappears. In this latter case, negative-going excursion of the voltage pulse train causes a current $I_b$ to flow from positive terminal 19 through diode 21 into junction 22a, while positive-going excursions cause a current to flow from junction 22a to ground through diode 22. Current $I_b$ is exemplified by current pulse 41b of FIG. 2 while the step change of voltage across $C_3$ is exemplified by graph D which shows the voltage approaching $-V_s$ in the steps $-L_1, -L_2$ etc.

It should be especially noted that the amplitude of the frequency signal applied to base electrode 12b or 25b must be sufficiently high during each frequency cycle to force the applicable transistor 12 or 25 into saturation for a time equal to a substantial portion of a period of a resulting current pulse. It should also be noted that the voltage across $C_3$ is limited by the forward voltage drops of two diodes serially connected.

In normal operation, individual voltage pulse trains will appear at both collector electrodes 12c and 25c. The voltage across $C_3$ will attain a resultant level $V_o$ which is proportional to the difference in the frequency outputs of sensor 10 and 26, at which time $I_r$ will be equal to $I_b$.

The following is a mathematical model of the computing circuit described to this point where:

$N_R$=pulse repetition frequency of signal generated by sensor 10

$N_B$=pulse repetition frequency signal generate by sensor 26

$S$=slip=$(N_R-N_B)/N_R$ and $C_1=C_2$ $R_1=R_2$ then $I_r=N_R(V_s-V_o)C_3$ $I_b=N_B(V_s+V_o)C_3$ for an equilibrium condition to exist $I_r=I_b$ so that:

$N_R(V_s-V_o)=N_B(V_s+V_o)$ rearranging terms:

$$V_o=\frac{N_R-N_B}{N_R+N_B}V_s$$

$$V_o=\frac{S}{2-S}V_{so}$$

It can thus be seen that with $V_s$ constant, slip voltage $V_o$ is a measure of wheel slip which may be suitably detected by a high input impedance probe such as a filed effect transistor amplifier wherein slip voltage $V_o$ is impressed on the gate electrode as seen in FIG. 1, wherein point 19 is coupled to gate electrode 33a through the filter network comprises of resistor 30 and capacitor 31 to remove alternating components therefrom. The source-drain circuit of field effect transistor 33 is serially connected with resistors 34 and 35 across DC voltage source 13, so that a voltage related to slip voltage $V_o$, which can be used in any known manner such as by comparison against one or more predetermined standard voltages in a comparator means, is presented at terminal 36, the source electrode of transistor 33.

As has been previously discussed, the output of the comparator means (not shown) can be advantageously utilized to control in an adaptive braking system a brake force attenuator to relieve an incipient skid, to actuate means, in a constant speed differential for locking the differential or for other suitable purposes.

The invention I claim is:

1. Means for generating an output voltage related to the frequency difference between a first frequency electrical signal and a second frequency electrical signal comprising first input terminal means for receiving said first frequency electrical signal;

an output terminal;

charge storage means connected to said output terminal for storing electrical charges;

first means connected to said first input terminal means for converting said first frequency electrical signal to a first train of pulses related to the instantaneous value of said output voltage;

first current means connected between said first converting means and said output terminal for permitting electrical current to flow therethrough toward said output terminal;

second input terminal means for receiving said second frequency electrical signal;

second means connected to said second input terminal means for converting said second frequency electrical signal to a second train of pulses related to the instantaneous value of said output voltage; and, second current means connected between said second converting means and said output terminal for permitting electrical current to flow therethrough away from said output terminal, a resultant voltage at said output terminal comprising said output voltage.

2. Generating means as recited in claim 1 with additionally a high input impedance probe means for sampling said output voltage.

3. Generating means as recited in claim 1 wherein said first converting means comprises:
   a constant voltage source;
   a first capacitor having one end connected to said first current means;
   a first transistor having a collector-emitter circuit connected between said constant voltage source and said first capacitor other end and a base electrode connected to said first input terminal means; and wherein said second converting means comprises:
   a second capacitor having one end connected to said second current means; and,
   a second transistor having a collector-emitter circuit connected between said constant voltage source and said second capacitor other end circuit, and a base electrode connected to said second input terminal means.

4. Generating means as recited in claim 3 wherein said first and second transistors are poled alike.

5. Generating means as recited in claim 3 wherein said charge storage means comprises a charge storage capacitor having a first end connected to said output terminal and a second end connected to return current to said constant voltage source.

6. Generating means as recited in claim 5 wherein said first capacitor is essentially identical to said second capacitor.

7. A slip computer for generating an output voltage proportional to the frequency difference between a first frequency signal and a second frequency signal including a source of DC power comprising:
   a charge storage element;
   a first transistor having an emitter-collector circuit connected across said DC power source and a base electrode connected to receive said first frequency signal;
   a first unidirectional current means for passing charges to said charge storage element;
   a first capacitor connected between said first transistor emitter-collector circuit and said first unidirectional current means;
   a second transistor having an emitter-collector circuit connected across said DC power source and a base electrode connected to receive said second frequency signal;
   a second unidirectional current means for passing charges away from said charge storage element; and,
   a second capacitor connected between said second transistor emitter-collector circuit and said second unidirectional current means.

8. A slip computer as recited in claim 7 with additionally:
   a third unidirectional current means connected to said DC power source for passing charges into the junction of said first capacitor with said first unidirectional current means; and,
   a fourth unidirectional current means connected to said DC power source for passing charges away for the junction of said second capacitor with said second unidirectional current means.

9. A slip computer as recited in claim 8 wherein said first capacitor is essentially identical to said second capacitor.

10. A slip computer as recited in claim 9 with additionally a high input impedance probe for sampling said output voltage.

11. A slip computer as recited in claim 10 wherein said probe comprises a field effect transistor having a drain-source circuit resistively connected across said DC power source and a gate electrode coupled to receive said output voltage.

12. Means including a DC power source having first and second terminals for generating an output voltage related to the difference in frequency between a first signal and a second signal comprising:
   first input terminal means for receiving said first signal;
   an output terminal;
   charge storage means connected between said output terminal and said first terminal;
   means responsive to said first signal for generating a first train of pulses;
   first means responsive to said train of pulses and said output voltage for supplying charges to said output terminal;
   second input terminal means for receiving said second signal;
   means responsive to said second signal for generating a second train of pulses; and,
   second means responsive to said second train of pulses and said output voltage for removing charges from said output terminal, a resultant voltage at said output terminal comprising said output voltage.

13. Means as recited in claim 12 wherein said first means comprises a counting circuit including:
   a first capacitor having one end connected to receive said first train of pulses;
   a first diode connected between said first capacitor other end and said output terminal;
   a second diode connected between said first terminal and said first capacitor other end; and wherein said second means comprises a second counting circuit including:
   a second capacitor having one end connected to receive second train of pulses;
   a third diode connected between said second capacitor other end and said output terminal; and,
   a fourth diode connected between said first terminal and said second capacitor other end.

14. Means as recited in claim 13 in said first capacitor is essentially identical to said second capacitor and said charge storage means comprises a third capacitor.

15. Means as recited in claim 13 wherein said means for generating a first train of pulses comprises:
   a first transistor having an emitter electrode connected to one of said DC power source terminals, a base electrode connected to receive said first signal, and a collector electrode connected to said first capacitor one end;
   a first resistor connected between said first transistor collector-electrode and said power source other terminal; and wherein said means for generating a second train of pulses comprises:
   a second transistor having an emitter electrode connected to said one DC power source terminal, a base electrode connected to receive said second signal, and a collector electrode connected to said second capacitor one end; and,
   a second resistor connected between said second transistor collector electrode and said power source other terminal.